US012580637B2

(12) United States Patent (10) Patent No.: US 12,580,637 B2
Cai et al. (45) Date of Patent: Mar. 17, 2026

(54) METHODS FOR ENHANCING RLC IN IoT NTN

(71) Applicant: MediaTek Singapore Pte. Ltd., Singapore (SG)

(72) Inventors: Yao-Hua Cai, Shanghai (CN); Abhishek Roy, San Jose, CA (US); FangMing Shi, Shanghai (CN); Yulan Liu, Shanghai (CN); Chen Qian, Shanghai (CN)

(73) Assignee: MediaTek Singapore Pte Ltd.

( * ) Notice: Subject to any disclaimer, the term of this patent is extended or adjusted under 35 U.S.C. 154(b) by 362 days.

(21) Appl. No.: 18/476,827

(22) Filed: Sep. 28, 2023

(65) Prior Publication Data

US 2024/0039623 A1 Feb. 1, 2024

Related U.S. Application Data

(63) Continuation of application No. PCT/CN2022/107926, filed on Jul. 26, 2022.

(30) Foreign Application Priority Data

Jul. 26, 2022 (WO) ................ PCT/CN2022/107926
Jul. 18, 2023 (CN) .......................... 202310882671.4

(51) Int. Cl.
*H04B 7/185* (2006.01)
(52) U.S. Cl.
CPC ..... *H04B 7/18513* (2013.01); *H04B 7/18519* (2013.01)
(58) Field of Classification Search
CPC ........................ H04B 7/18513; H04B 7/18519

USPC .......................................................... 370/316
See application file for complete search history.

(56) References Cited

U.S. PATENT DOCUMENTS

| 12,021,632 | B2 * | 6/2024 | Jardel | .................... | H04L 1/1887 |
|---|---|---|---|---|---|
| 2018/0049255 | A1 * | 2/2018 | Chen | ...................... | H04W 72/02 |
| 2018/0352471 | A1 * | 12/2018 | Benammar | ........... | H04L 1/1887 |
| 2022/0232503 | A1 * | 7/2022 | Cheng | ................. | H04W 56/009 |
| 2023/0068504 | A1 * | 3/2023 | Kumar | .................. | H04W 24/08 |
| 2024/0155374 | A1 * | 5/2024 | Wei | ....................... | H04B 7/0695 |
| 2025/0226923 | A1 * | 7/2025 | Yan | ....................... | H04L 5/0055 |

FOREIGN PATENT DOCUMENTS

| CA | 3206226 | A1 * | 10/2022 | ............. | H04W 36/08 |
|---|---|---|---|---|---|
| WO | WO-2023214807 | A1 * | 11/2023 | ............. | H04B 7/185 |

* cited by examiner

*Primary Examiner* — Anthony Mejia
(74) *Attorney, Agent, or Firm* — Helen Mao; Imperium Patent Works

(57) ABSTRACT

Apparatus and methods are provided for enhanced AM RLC for NB-IoT UE in the NTN. In one novel aspect, the UE is configured with HARQ disabled, and configured with fast polling and/or fast status report for AM RLC enhancement. In one embodiment, the UE is configured with shortened AM window size, and wherein the shortened window size is smaller than an AM window size for an NB-IoT device. In other embodiments, the fast polling is triggered based on PDU threshold or byte threshold, or triggered based on an NTN polling timer, or triggered based on a combination of an NTN polling timer and one or more threshold triggers. In one embodiment, UE is configured to autonomously send a status report when a reception failure of an RLC PDU is detected, and wherein the status report is sent by a semi-persistent scheduling (SPS) uplink resource.

20 Claims, 5 Drawing Sheets

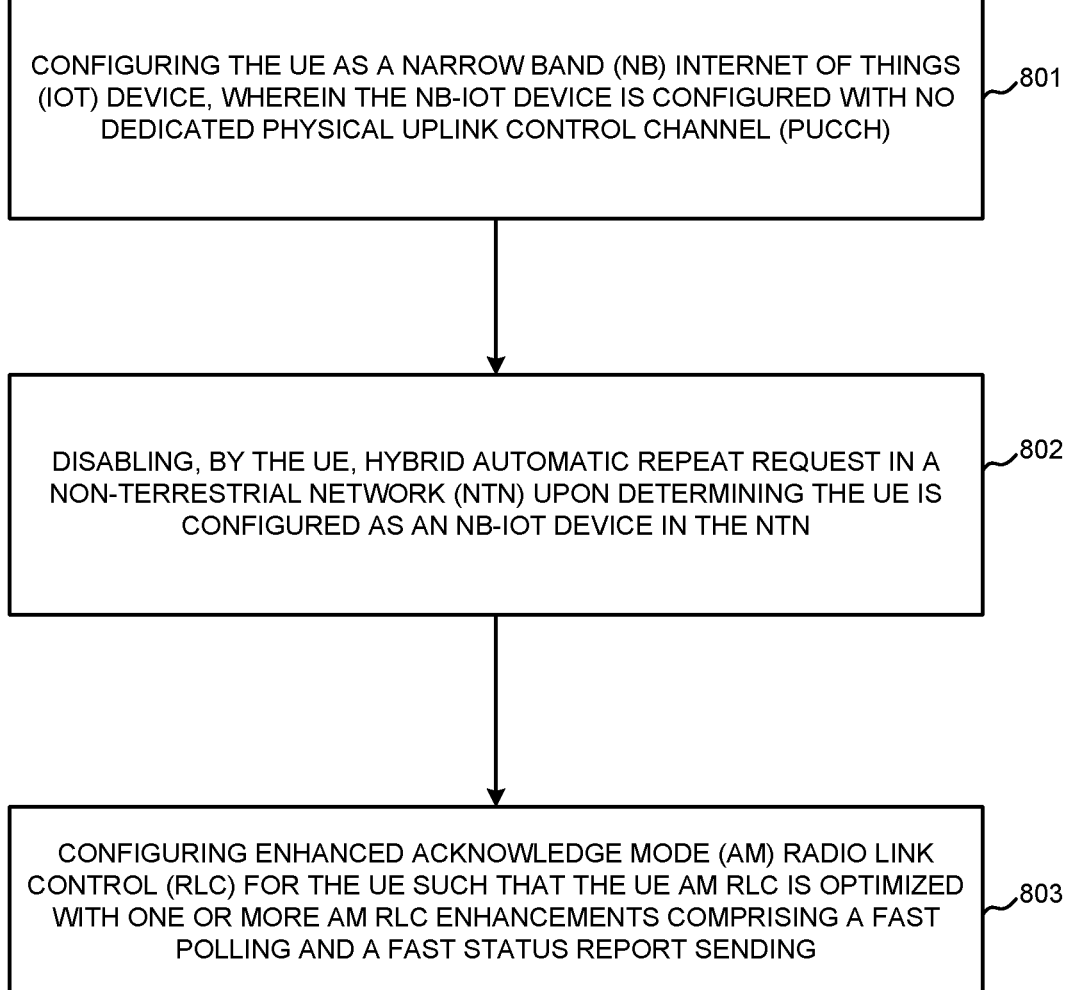

CONFIGURING THE UE AS A NARROW BAND (NB) INTERNET OF THINGS (IOT) DEVICE, WHEREIN THE NB-IOT DEVICE IS CONFIGURED WITH NO DEDICATED PHYSICAL UPLINK CONTROL CHANNEL (PUCCH)          801

DISABLING, BY THE UE, HYBRID AUTOMATIC REPEAT REQUEST IN A NON-TERRESTRIAL NETWORK (NTN) UPON DETERMINING THE UE IS CONFIGURED AS AN NB-IOT DEVICE IN THE NTN          802

CONFIGURING ENHANCED ACKNOWLEDGE MODE (AM) RADIO LINK CONTROL (RLC) FOR THE UE SUCH THAT THE UE AM RLC IS OPTIMIZED WITH ONE OR MORE AM RLC ENHANCEMENTS COMPRISING A FAST POLLING AND A FAST STATUS REPORT SENDING          803

FIG. 8

METHODS FOR ENHANCING RLC IN IoT NTN

CROSS REFERENCE TO RELATED APPLICATIONS

This application is filed under 35 U.S.C. § 111 (a) and is based on and hereby claims priority under 35 U.S.C. § 120 and § 365 (c) from International Application No. PCT/CN2022/107926, titled "METHODS FOR ENHANCING RLC IN IOT NTN," with an international filing date of Jul. 26, 2022. This application claims priority under 35 U.S.C. § 119 from Chinese Application Number CN 202310882671.4 titled "Methods for Enhancing RLC in IoT NTN," filed on Jul. 18, 2023. The disclosure of each of the foregoing documents is incorporated herein by reference.

TECHNICAL FIELD

This disclosure relates generally to wireless communications and, more particularly, to methods and apparatus for enhancing radio link control (RLC) in Internet of Things (IoT) non-terrestrial network (NTN).

BACKGROUND

Internet of Things (IoT) network enables the communication between electronic devices/user equipment (UEs) through the internet. The IoT network enables smart city, smart homes, pollution control, energy saving, smart transportation, and provides many innovative solutions to various challenges. With the development of the wireless technology, IoT is integrated with the latest wireless technology. The narrow band IoT (NB-IoT) devices uses fifth-generation (5G) telecommunication systems, including new radio (NR) network and non-terrestrial networks (NTN). Hybrid automatic repeat request (HARQ) is mainly used for scheduling management, such as the initial transmission and retransmission of information. In scenarios with large transmission delays, such as NTN, HARQ increases transmission delays and power consumption. Due to the large round-trip delay in the NTN scenario, HARQ feedback significantly decreases the data throughput. On the other hand, the RLC polling and STATUS reporting mechanism in IoT NTN especially for narrow band IoT (NB-IoT), which carries the RLC feedback information is weaker than regular LTE. It takes more time or resource to transmit the RLC feedback, hence the data transmission latency will deteriorate if HARQ feedback is disabled. In order to compensate for the loss of transmission latency, acknowledged mode (AM) RLC needs to be enhanced.

Improvements and enhancements are required for AM RLC configuration and operation for NB-IoT devices in the NTN.

SUMMARY

Apparatus and methods are provided for enhanced AM RLC for NB-IoT UE in the NTN. In one novel aspect, the UE is configured as NB-IoT in the NTN with HARQ disabled, and configures one or more AM RLC enhancements including fast polling and fast status report. In one embodiment, the UE is configured with shortened AM window size, and wherein the shortened window size is smaller than an AM window size for an NB-IoT device. In another embodiment, the fast polling is triggered when a number of unacknowledged AM RLC packet data unit (PDU) is greater than a PDU threshold or when a number of unacknowledged byte is greater than a byte threshold. In one embodiment, the PDU threshold is preconfigured, predefined, or dynamically determined by the UE, and/or the byte threshold is preconfigured, predefined, or dynamically determined by the UE. In another embodiment, the fast polling is triggered when an NTN polling timer expired without an AM RLC polling. The timer value of the NTN polling timer is preconfigured, predefined, or dynamically determined by the UE. In yet another embodiment, the fast polling is triggered based on a combination of an NTN polling timer and one or more threshold triggers comprising a number of unacknowledged AM RLC PDU is greater than a PDU threshold, and a number of unacknowledged AM RLC byte is greater than a byte threshold. In one embodiment, the fast polling is triggered when the NTN timer expired without a polling and at least one of the threshold triggers is detected. The UE is configured to autonomously send a status report when a reception failure of an RLC PDU is detected, and wherein the status report is sent by a semi-persistent scheduling (SPS) uplink resource.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 illustrates an exemplary flow chart of enhanced AM RLC for the NB-IoT UE in the NTN in accordance with embodiments of the current invention.

DETAILED DESCRIPTION

Reference will now be made in detail to some embodiments of the invention, examples of which are illustrated in the accompanying drawings.

Several aspects of telecommunication systems will now be presented with reference to various apparatus and methods. These apparatus and methods will be described in the following detailed description and illustrated in the accompanying drawings by various blocks, components, circuits, processes, algorithms, etc. (Collectively referred to as "elements"). These elements may be implemented using electronic hardware, computer software, or any combination thereof. Whether such elements are implemented as hardware or software depends upon the particular application and design constraints imposed on the overall system.

Figure 1:
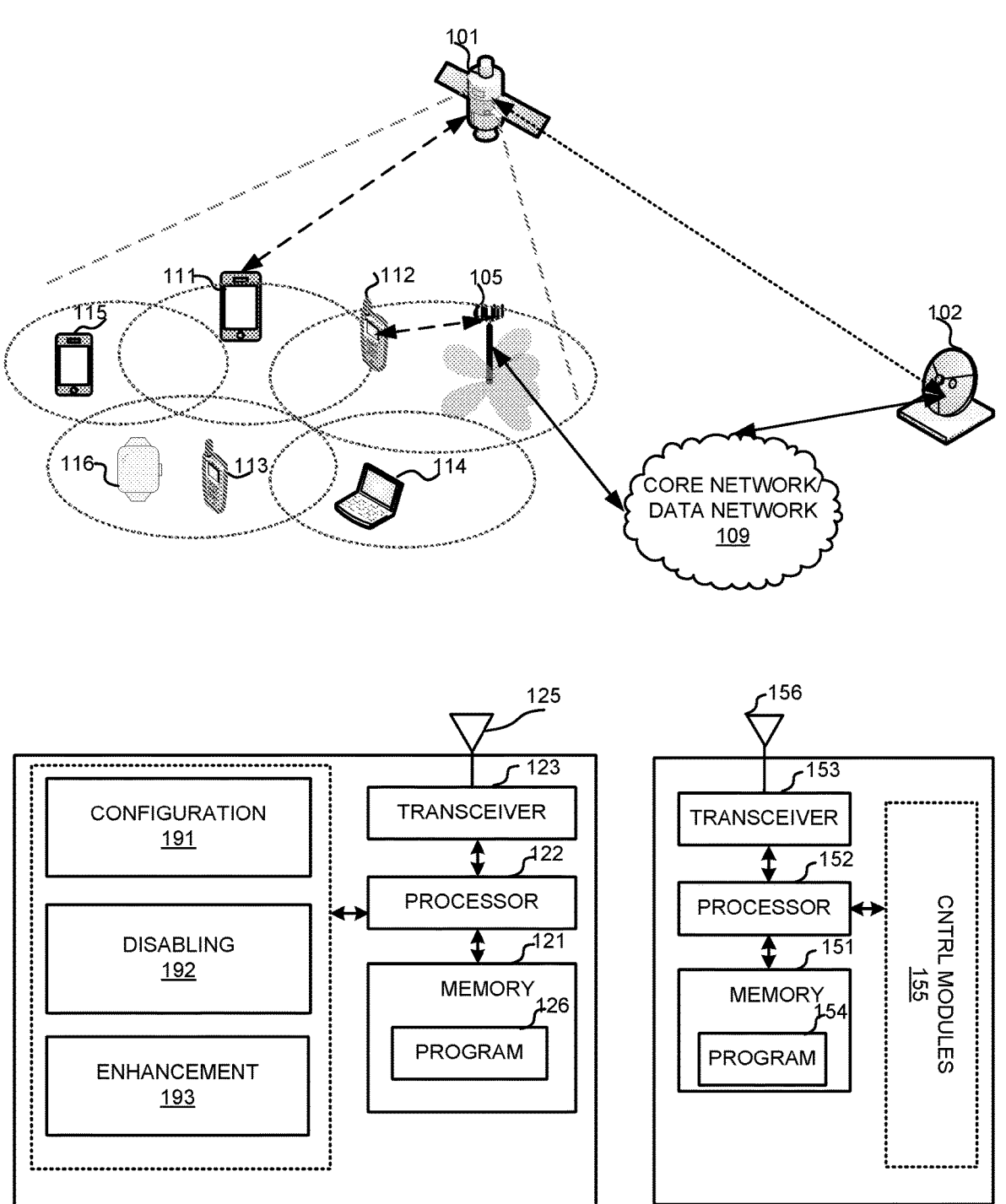
FIG. 1 illustrates a schematic system diagram for NB-IoT devices with enhanced AM RLC in the NTN in accordance with embodiments of the current invention.

FIG. 1 illustrates a schematic system diagram illustrating an exemplary system diagram for NB-IoT devices with enhanced AM RLC in the NTN in accordance with embodiments of the current invention. The NTN IoT network includes multiple communication devices or mobile stations, such as mobile phones, tablets, laptops, and other 5G devices whether movable, mobile, or stationary, as exemplary illustrated UEs 111, 112, 113, 114, 115, and 116. The UE in the NTN IoT network can establish a communication link with one or more network devices, i.e., NTN nodes, or NR base stations. For example, various NIN nodes 101, NTN gateway 102, and an NR base station 105. The network node can be a communication node, such as radio access network (RAN) such as a 5G base station (gNB), an evolved universal mobile telecommunications system (UMTS), a terrestrial radio access (E-UTRA), an enhanced 4G eNodeB E-UTRA base station (eN), e.g., an enhanced Node B, an enhanced gnB (en-gNB), or a next generation eNB (ng-eNB). The NTN node can be implemented using various non-terrestrial systems. Core network/data network 109 can be a homogeneous network or heterogeneous network, which can be deployed with the same frequency or different frequencies. IoT system is mainly divided into NB-IoT and eMTC, based on different system bandwidth and coverage. The bandwidth used by NB-IoT is about 200 kHz and supports the transmission of low traffic data at a rate below 100 kbps. EMTC technology utilizes 1.4 MHz bandwidth and the maximum data transmission rate is 1 Mbps. Based on the current spec 36.211 and 36.213, in the NB-IoT scenario, the downlink supports one or two HARQ processes. In the eMTC scenario, the downlink can support up to sixteen HARQ processes for eMTC CE Mode A and up to 4 HARQ processes for eMTC CE Mode B.

In one novel aspect, the HARQ is disabled for NB IoT devices/UEs in the NTN. The enhanced AM RLC is configured for the UE with the HARQ disabled. In one embodiment, the enhanced AM RLC is configured with fast polling. In another embodiment, the enhanced AM RLC is configured with fast status report. In one embodiment, to increase the frequency for polling, the shortened AM RLC window size is configured. Shortening the AM RLC window size can reduce the number of un-acknowledged RLC data PDUs that are required to fulfill the window stall, which triggers the polling. Another way to increase the frequency of polling is to add more conditions to trigger polling, such as adding threshold triggers, timer triggers, and the combination of timer and threshold triggers.

FIG. 1 further illustrates simplified block diagrams of a mobile device/UE to perform the enabling and disabling of HARQ feedback process in the IoT network. The UE has an antenna 125, which transmits and receives radio signals. An RF transceiver circuit 123, coupled with the antenna, receives RF signals from antenna 125, converts them to baseband signals, and sends them to processor 122. In one embodiment, the RF transceiver may comprise two RF modules (not shown). RF transceiver circuit 123 also converts received baseband signals from processor 122, converts them to RF signals, and sends out to antenna 125. Processor 122 processes the received baseband signals and invokes different functional modules to perform features in the UE 111. Memory 121 stores program instructions and data 126 to control the operations of the UE 111. Antenna

125 sends uplink transmission and receives downlink transmissions to/from base stations.

The UE also includes a set of control modules that carry out functional tasks. These control modules can be implemented by circuits, software, firmware, or a combination of them. A configuration module 191 configures the UE as a narrow band (NB) Internet of Things (IoT) device, wherein the NB-IoT device is configured with no dedicated physical uplink control channel (PUCCH). A disabling module 192 disables hybrid automatic repeat request in the non-terrestrial network (NTN) upon determining the UE is configured as an NB-IoT device in the NTN. An enhancement module 193 configures enhanced acknowledge mode (AM) radio link control (RLC) for the UE such that the UE AM RLC is optimized with one or more AM RLC enhancements comprising a fast polling and a fast status report sending.

FIG. 1 further illustrates simplified block diagrams of an IoT network entity, such as a eNB/gNB 105. eNB/gNB 105 has antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in eNB/gNB 105. Memory 151 stores program instructions and data 154 to control the operations of eNB/gNB 105. eNB/gNB 105 also includes a set of control modules 155 that carry out functional tasks to communicate with mobile devices, such as UE 112.

Figure 2:
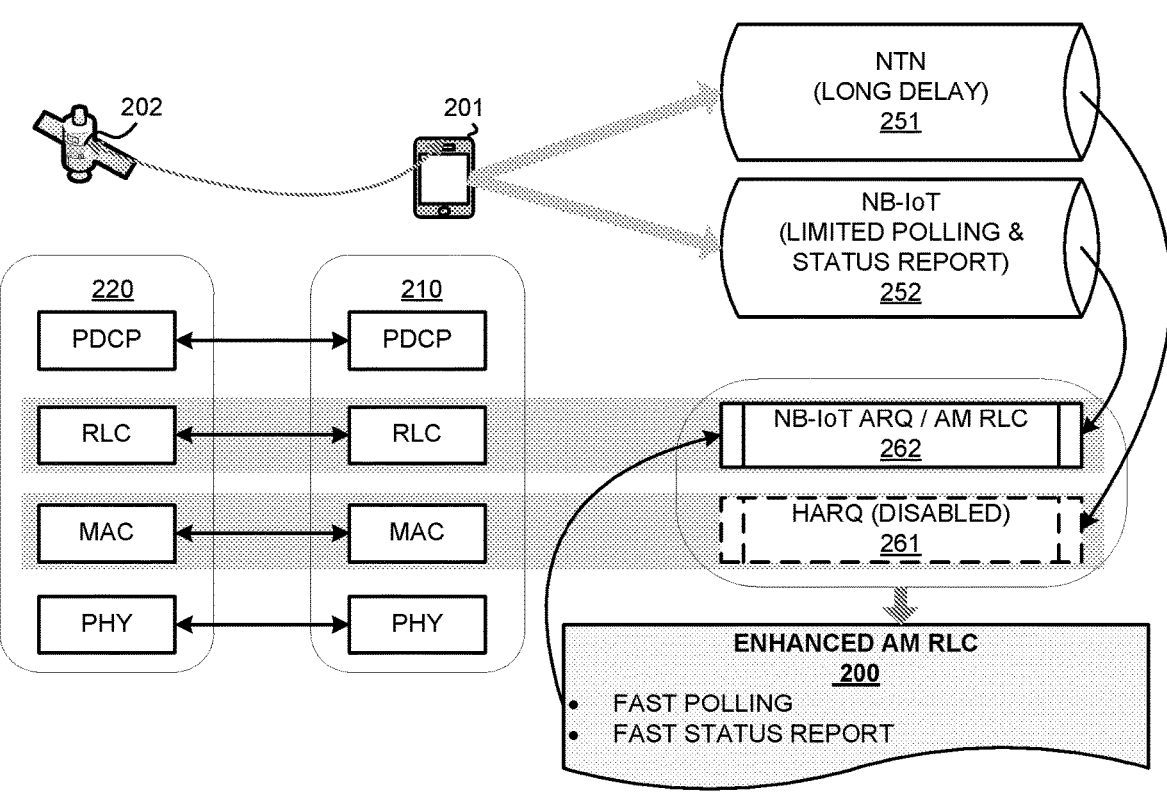
FIG. 2 illustrates exemplary top level diagrams of the enhanced AM RLC for NB IoT UE in the NTN in accordance with embodiments of the current invention.

FIG. 2 illustrates exemplary top level diagrams of the enhanced AM RLC for NB IoT UE in the NTN in accordance with embodiments of the current invention. UE 201, with a protocol stack 210, is configured as the NB IoT device and is connected in the NTN through NTN network node, such as NTN node 202, with a protocol stack 220. In the traditional network, the HARQ is enabled at the MAC layer and ARQ/AM RLC is configured for the RLC layer. The IoT devices configured with HARQ processes perform HARQ.

In one scenario 251, when the UE is connected with the NTN, which has significantly large delay, the UE configured to disable HARQ (embodiment 261). For example, in the NTN, to accommodate the large propagation delay, there is a delay of Round Trip Time (RTT) before the HARQ feedback. During this delay, data transmission is pending. Hence the throughput of data transmission is relatively lower than the terrestrial network (TN) scenario. To improve the data rate and to save power consumption, in one embodiment 261, the HARQ feedback is disabled for the UE in the NTN. However, due to lack of HARQ feedback, RLC feedback for AM RLC entity become the last chance to guarantee the reliability of data transmission. Due to lack of HARQ feedback, it is predictable that RLC retransmission will increase.

In one scenario 252, for IoT NTN, especially for NB-IoT, the RLC polling and STATUS report mechanism (embodiment 262) is weaker than regular LTE. The polling is the one bit indication from the transmitting side of the AM RLC entity to the receiving side of AM RLC entity to request a STATUS report which contains the RLC feedback information (ACK/NACK). The conditions to trigger polling, like conditions based on unacknowledged RLC PDU number and conditions based on unacknowledged byte number, are not applicable for NB-IoT. The rest of the conditions are: 1) "if both the transmission buffer and the retransmission buffer become empty (excluding transmitted RLC data PDU awaiting for acknowledgements) after the transmission of the RLC data PDU", 2) "if no new RLC data PDU can be transmitted after the transmission of the RLC data PDU (e.g. due to window stalling)". Hence, only when all the data has been transmitted or window stalling (all the unacknowledged RLC PDU has reached the sending window), the polling can be triggered. The chance of triggering polling is rare. The failure reception of RLC PDU will block the delivering data to the upper layer. Considering the increasing chance of failure reception of RLC PDU, and the rare chance of polling which requests the peer AM RLC entity to retransmit the data, the chance of blockage will increase. As a result, the data transmission latency will suffer. Further, in the downlink transmission, UE can autonomously send STATUS report when the receiving side of AM RLC entity in UE detects a reception failure of an RLC data PDU by the SN gap. For NB-IoT which has no dedicated Physical Uplink Control Channel (PUCCH), UE needs to apply the uplink grant by the random access procedure to send the UL STATUS report. The cell's coverage in the NTN scenario is typically larger than in the TN scenario, and probably is not adjustable due to the limit satellite resource, so the number of UE covered by the cell could be much greater than in the TN scenario. The random access preamble resource is more likely to be deficient. Not only are the resources limited, but also the random access latency is much higher than in the TN scenario. A typical Random Access procedure takes four steps, each step takes 20 ms to for low earth orbit (LEO) and 270 ms for geostationary earth orbit (GEO), compared to less than 1 ms in TN scenario. It takes valuable random access preamble resource and large transmission latency to send the status report when detecting a reception failure of an RLC PDU.

In one novel aspect 200, the enhanced AM RLC is used for the UE configured as NB-IoT device in the NTN. In one embodiment, fast polling is implemented. In another embodiment, fast status report is implemented. In yet another embodiment, combinations of the different enhancements are implemented for the AM RLC. To add more chances to send polling to compensate for the loss of the data transmission latency, and to improve the situation of UE autonomously sending STATUS report (to save the valuable random access preamble resource and reduce the latency of sending STATUS report), the enhanced RLC in IoT NTN, especially for polling and STATUS report mechanism are used.

Figure 3:
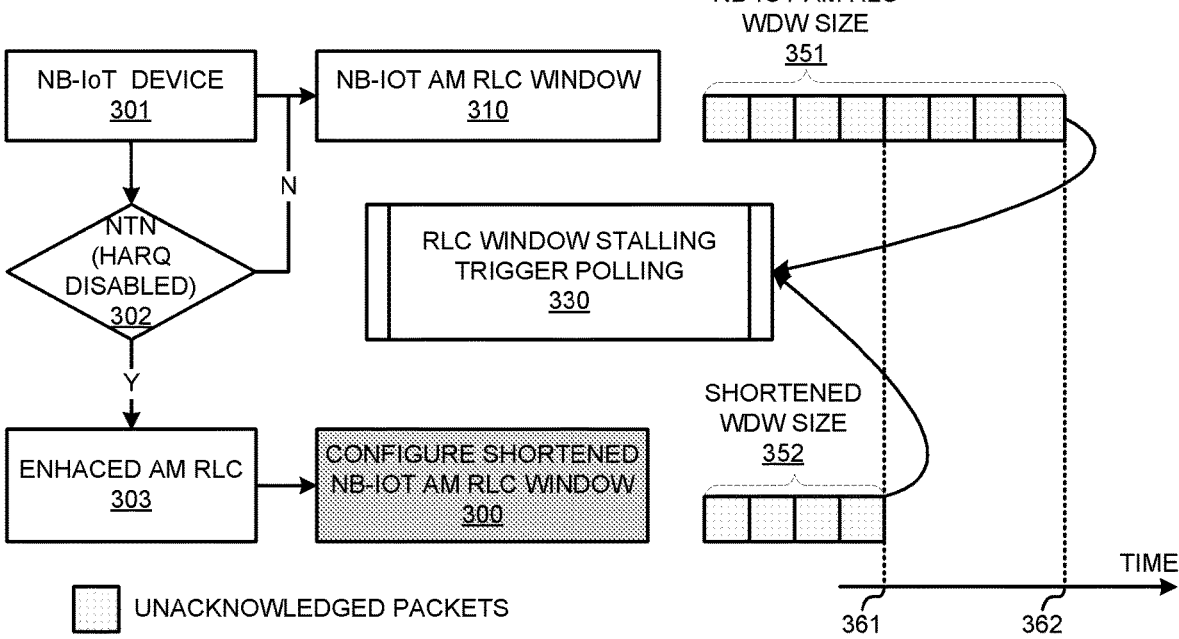
FIG. 3 illustrates an exemplary diagram for a shortened AM RLC window size for the enhanced AM RLC in accordance with embodiments of the current invention.

FIG. 3 illustrates an exemplary diagram for a shortened AM RLC window size for the enhanced AM RLC in accordance with embodiments of the current invention. In one embodiment, enhanced AM RLC for the UE has a shortened AM window size, and wherein the shortened window size is smaller than an AM window size for an NB-IoT device. In the condition of window stalling, polling can be triggered to request peer AM RLC entity to send STATUS report. Shortening the AM RLC window size can trigger polling more easily. In one scenario 301, the UE configured as NB-IoT device. The NB-IoT has a normal AM RLC window size configured, for example, the window size 351 for NB-IoT is 512. The UE at step 302 determines whether it is in the NTN with HARQ disabled. If step 302 determines no, the UE is configured with the normal AM RLC window size at step 310. If step 302 determines yes, the enhanced AM RLC is configured at step 303. In one embodiment 300, the UE is configured with shortened AM RLC window size 352. As illustrated, as the unacknowledged packets increase, the window stall triggers polling at time 362 for UE with normal AM RLC window size (step 330).

The UE with enhanced AM RLC configured with shortened AM RLC window size triggers polling at time 361 (step 330), which is earlier than the non-enhanced UE.

Figure 4:
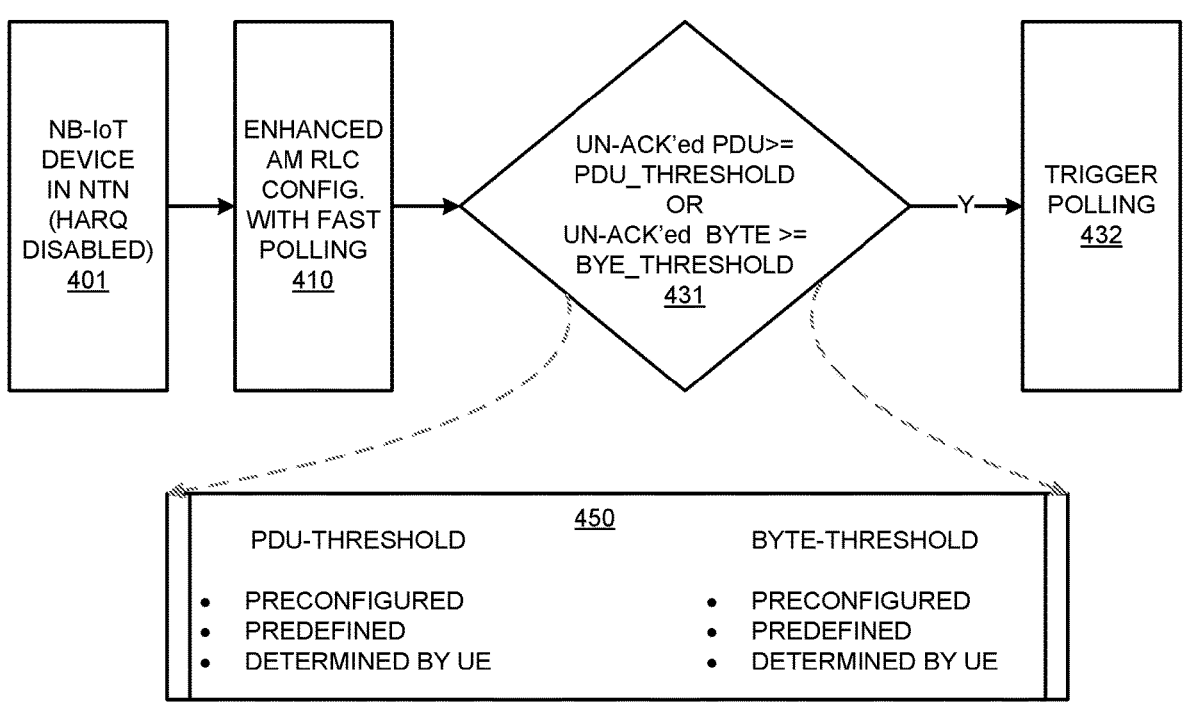
FIG. 4 illustrates an exemplary diagram for fast polling with condition trigger for the enhanced AM RLC in accordance with embodiments of the current invention.

FIG. 4 illustrates an exemplary diagram for fast polling with condition trigger for the enhanced AM RLC in accordance with embodiments of the current invention. One way to enhance the AM RLC for the NB-IoT in the NTN is to trigger polling faster. In one embodiment, the fast polling is triggered when a number of unacknowledged AM RLC PDU is greater than a PDU threshold or when a number of unacknowledged byte is greater than a byte threshold. For the NB-IoT devices, these triggers are not used. To allow more frequent polling, these two conditions can be added to NB-IoT upon determining that the UE is operating in the NTN. At step 401, the UE determines the UE is configured as NB-IoT in the NTN and with HARQ disabled. In one embodiment 410, the UE configures one or more thresholds to enable fast polling. At step 431, the UE determines if the number of unacknowledged AM RLC PDU is greater than a PDU threshold or the unacknowledged bytenumber is greater than a byte threshold. If step 431 determines yes, the polling is triggered at step 432. In one embodiment 450, the PDU threshold is preconfigured, predefined, or dynamically determined by the UE, and the byte threshold is preconfigured, predefined, or dynamically determined by the UE. For example, if the unacknowledged RLC PDU number (PDU_WITHOUT_POLL) crosses a threshold, a NB-IoT AM RLC entity in NTN can include a poll bit in the RLC data PDU. This threshold can be preconfigured by the RRC parameter, or it can be specified in the specification, or it can be left up to implementation. If the unacknowledged bytenumber (BYTE_WITHOUT_POLL) crosses a threshold, a NB-IoT AM RLC entity in NTN can include a poll bit in the RLC data PDU. This threshold can be preconfigured by the RRC parameter, or it can be specified in the specification, or it can be left up to implementation. Upon assembly of a new AMD PDU, the transmitting side of an AM RLC entity, increment PDU_WITHOUT_POLL by one, increment BYTE_WITHOUT_POLL by every new byte of Data field element that it maps to the Data field of the RLC data PDU.

Figure 5:
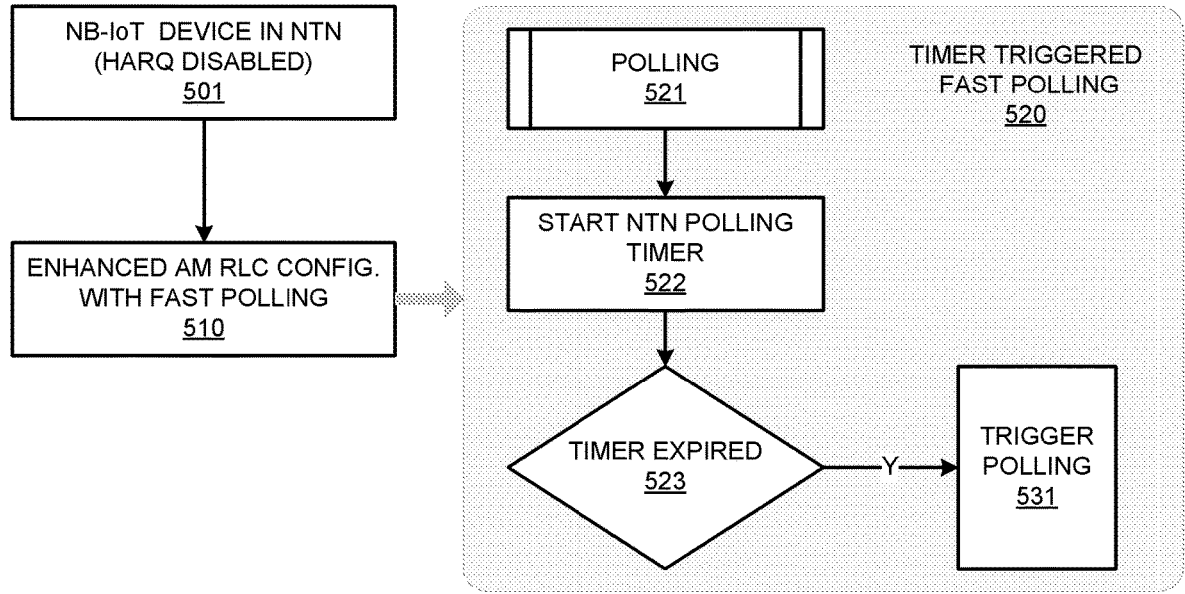
FIG. 5 illustrates an exemplary diagram for fast polling with timer based enhancement for AM RLC in accordance with embodiments of the current invention.

FIG. 5 illustrates an exemplary diagram for fast polling with timer based enhancement for AM RLC in accordance with embodiments of the current invention. In one embodiment, the fast polling is triggered when an NTN polling timer expired without an AM RLC polling. After a period of time without triggering polling, AM RLC entity can include the poll bit in the RLC data PDU, regardless of the unacknowledged RLC PDU number and unacknowledged byte number. At step 501, the UE determines the UE is configured as NB-IoT in the NTN and with HARQ disabled. At step 510, the UE configures enhanced AM RLC with fast polling. In one embodiment 520, the fast polling is triggered by a NTN polling timer expiration. For example, at step 521, the polling is performed. At step 522, the UE starts the NTN polling timer. At step 523, the UE determines if the NTN polling timer is expired. If step 523 determines yes, at step 531, the UE triggers polling by including the poll bit in the RLC data PDU. The poll bit is included regardless of the unacknowledged packets. The value of the NTN poll timer can be preconfigured by the RRC parameter, or it can be specified in the specification, or it can be left up to implementation.

Figure 6:
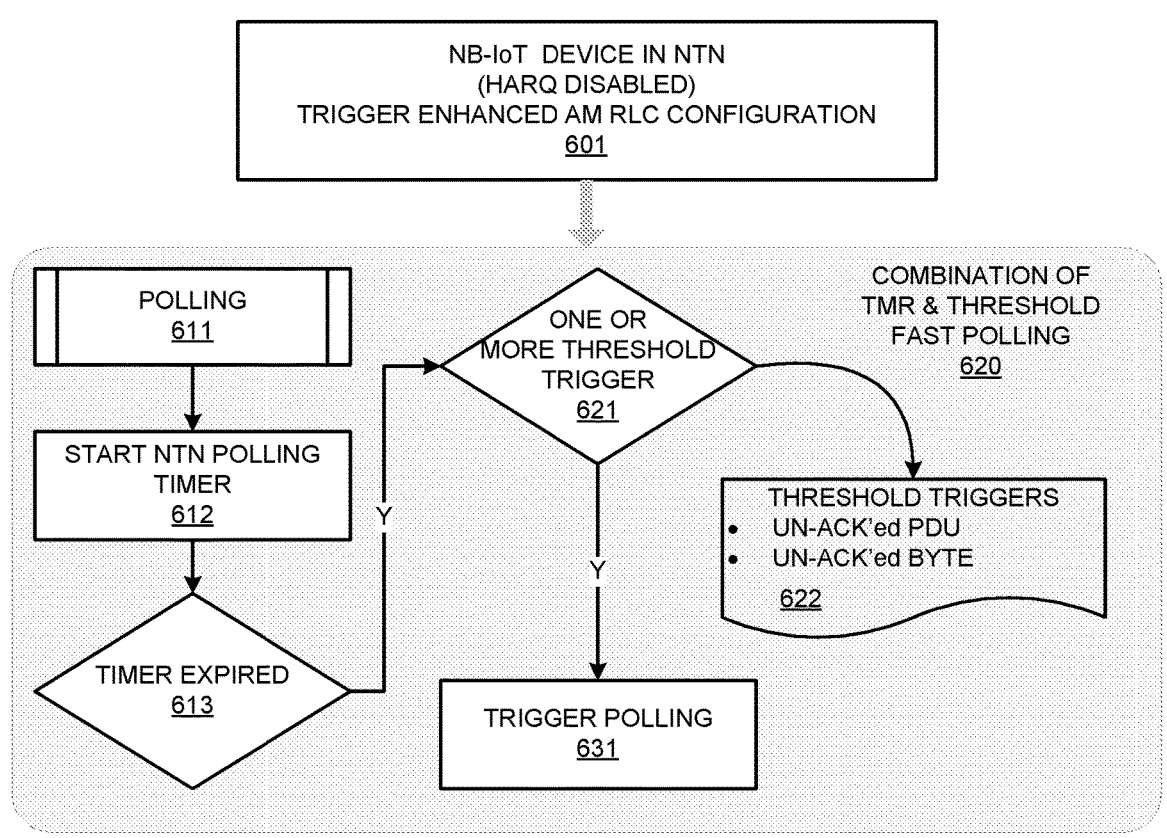
FIG. 6 illustrates an exemplary diagram for fast polling with the combination of condition trigger and timer based enhancement for AM RLC in accordance with embodiments of the current invention.

FIG. 6 illustrates an exemplary diagram for fast polling with the combination of condition trigger and timer based enhancement for AM RLC in accordance with embodiments of the current invention. In one embodiment, the fast polling is triggered based on a combination of an NTN polling timer and one or more threshold triggers comprising a number of unacknowledged AM RLC PDU is greater than a PDU threshold, and a number of unacknowledged AM RLC byte is greater than a byte threshold. At step 601, the UE is configured at NB-IoT device and is connected in the NTN with HARQ disabled. In one embodiment 620, the combination of an NTN polling timer and one or more threshold triggers are used for the fast polling. After a period of time without triggering polling combined with a certain unacknowledged RLC PDU number and/or unacknowledged byte number, AM RLC entity can include the poll bit in the RLC data PDU. For example, at step 611, the polling is triggered. At step 612, the NTN polling timer is started. At step 613, the UE determines if the NTN polling timer is expired. If step 613 determines yes, at step 621, the UE determines if the one or more threshold triggers are detected. In one embodiment 622, the one or more threshold triggers includes the unacknowledged PDUs are greater than a combination_PDU threshold, and the unacknowledged bytes are greater than a comination_byte threshold. The period of time can be preconfigured by the RRC parameter, or it can be specified in the specification, or it can be left up to implementation. The threshold/combination_threshold of unacknowledged RLC PDU number and unacknowledged byte number can be preconfigured by the RRC parameter, or it can be specified in the specification, or it can be left up to implementation. If step 621 determines yes, at step 631, the polling is triggered. The UE AM RLC entity can include the poll bit in the RLC data PDU.

Figure 7:
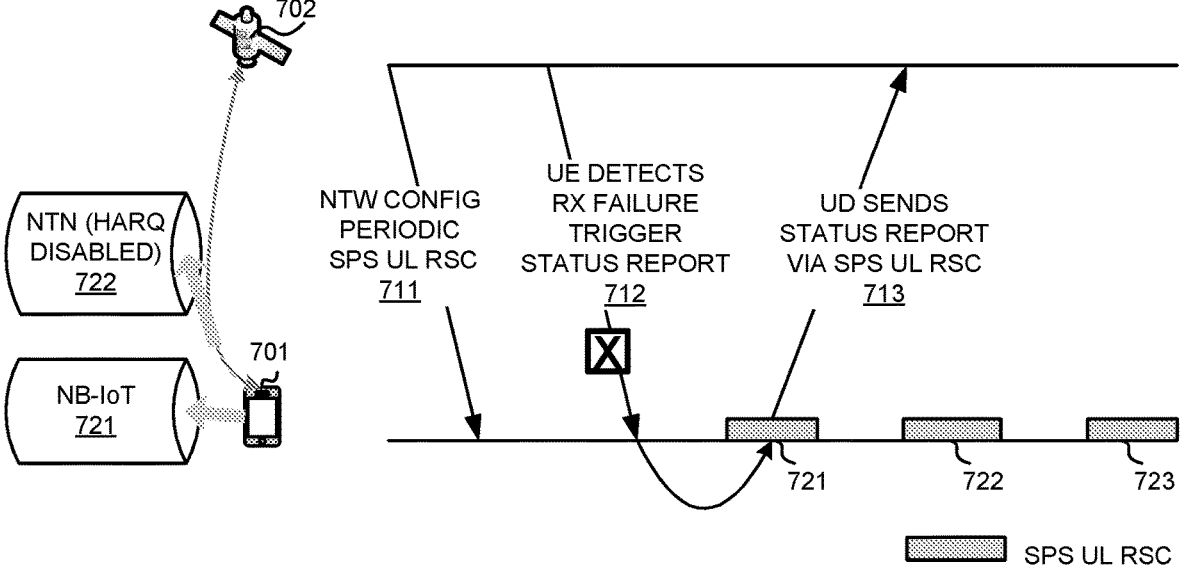
FIG. 7 illustrates an exemplary diagram for fast status report using SPS UL resource in accordance with embodiments of the current invention.

FIG. 7 illustrates an exemplary diagram for fast status report using SPS UL resource in accordance with embodiments of the current invention. In one embodiment, the UE autonomously sends a status report when a reception failure of an RLC PDU is detected, and wherein the status report is sent by a semi-persistent scheduling (SPS) uplink resource. The pre-configured SPS periodical UL resource can be utilized to transfer the STATUS report when NTN capable NB-IoT UE detects a reception failure of an RLC PDU. In this case, since the UE uses preconfigured NPUSCH resource, the valuable Random Access preamble resource can be saved. There are four steps of the random access procedure, so the long transmission latency can be saved. Since the SPS resource has already been configured to UE, the condition to send STATUS report is not limited to only when UE detects a reception failure of an RLC data PDU. In one embodiment, the UE sends the STATUS report when the periodical SPS resource can be utilized as long as the STATUS report is not empty. For example, UE 701 is configured as NB-IoT (step 721). UE 701 is connected with NTN through NTN node 702, and HARQ is disabled (step 722). At step 711, the NTN configures periodic SPS UL resources, such as resources 721, 722, and 723. At step 712, the UE detects reception failure and triggers status report. At step 713, the UE sends the status report via the configured SPS UL resource 721.

FIG. 8 illustrates an exemplary flow chart of enhanced AM RLC for the NB-IoT UE in the NTN in accordance with embodiments of the current invention. At step 801, the UE configures the UE as a narrow band (NB) Internet of Things (IoT) device, wherein the NB-IoT device is configured with no dedicated physical uplink control channel (PUCCH). At step 802, the UE disables hybrid automatic repeat request in a non-terrestrial network (NTN) upon determining the UE is configured as an NB-IoT device in the NTN. At step 803, the UE configures enhanced acknowledge mode (AM) radio link control (RLC) for the UE such that the UE AM RLC is optimized with one or more AM RLC enhancements comprising a fast polling and a fast status report sending.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a user equipment (UE), comprising:
configuring the UE as a narrow band (NB) Internet of Things (IoT) device, wherein the NB-IoT device is configured with no dedicated physical uplink control channel (PUCCH);
disabling, by the UE, hybrid automatic repeat request in a non-terrestrial network (NTN) upon determining the UE is configured as the NB-IoT device in the NTN; and
configuring enhanced acknowledge mode (AM) radio link control (RLC) for the UE such that the UE AM RLC is optimized with one or more AM RLC enhancements comprising a fast polling and a fast status report sending.

2. The method of claim 1, wherein the enhanced AM RLC for the UE has a shortened AM window size, and wherein the shortened window size is smaller than an AM window size for an NB-IoT device.

3. The method of claim 1, wherein the fast polling is triggered when a number of unacknowledged AM RLC packet data units (PDUs) is greater than a PDU threshold or when a number of unacknowledged bytes is greater than a byte threshold.

4. The method of claim 3, wherein the PDU threshold is preconfigured, predefined, or dynamically determined by the UE.

5. The method of claim 3, wherein the byte threshold is preconfigured, predefined, or dynamically determined by the UE.

6. The method of claim 1, wherein the fast polling is triggered when an NTN polling timer expired without an AM RLC polling.

7. The method of claim 6, wherein a timer value of the NTN polling timer is preconfigured, predefined, or dynamically determined by the UE.

8. The method of claim 1, wherein the fast polling is triggered based on a combination of an NTN polling timer and one or more threshold triggers comprising a number of unacknowledged AM RLC PDU is greater than a PDU threshold, and a number of unacknowledged AM RLC byte is greater than a byte threshold.

9. The method of claim 8, where the fast polling is triggered when the NTN polling timer expired without a polling and at least one of the threshold triggers is detected.

10. The method of claim 1, wherein the UE is configured to autonomously send a status report when a reception failure of an RLC PDU is detected, and wherein the status report is sent by a semi-persistent scheduling (SPS) uplink resource.

11. A user equipment (UE), comprising:
a transceiver that transmits and receives radio frequency (RF) signal in a non-terrestrial network (NTN);
a configuration module that configures the UE as a narrow band (NB) Internet of Things (IoT) device, wherein the NB-IoT device is configured with no dedicated physical uplink control channel (PUCCH);

a disabling module that disables hybrid automatic repeat request in the non-terrestrial network (NTN) upon determining the UE is configured as an NB-IoT device in the NTN; and an enhancement module that configures enhanced acknowledge mode (AM) radio link control (RLC) for the UE such that the UE AM RLC is optimized with one or more AM RLC enhancements comprising a fast polling and a fast status report sending.

12. The UE of claim 11, wherein the enhanced AM RLC for the UE has a shortened AM window size, and wherein the shortened window size is smaller than an AM window size for an NB-IoT device.

13. The UE of claim 11, wherein the fast polling is triggered when a number of unacknowledged AM RLC packet data units (PDUs) is greater than a PDU threshold or when a number of unacknowledged bytes is greater than a byte threshold.

14. The UE of claim 13, wherein the PDU threshold is preconfigured, predefined, or dynamically determined by the UE.

15. The UE of claim 13, wherein the byte threshold is preconfigured, predefined, or dynamically determined by the UE.

16. The UE of claim 11, wherein the fast polling is triggered when an NTN polling timer expired without an AM RLC polling.

17. The UE of claim 16, wherein a timer value of the NTN polling timer is preconfigured, predefined, or dynamically determined by the UE.

18. The UE of claim 11, wherein the fast polling is triggered based on a combination of an NTN polling timer and one or more threshold triggers comprising a number of unacknowledged AM RLC packet data units (PDUs) is greater than a PDU threshold, and a number of unacknowledged AM RLC bytes is greater than a byte threshold.

19. The UE of claim 18, where the fast polling is triggered when the NTN timer expired without a polling and at least one of the threshold triggers is detected.

20. The UE of claim 11, wherein the UE is configured to autonomously send a status report when a reception failure of an RLC PDU is detected, and wherein the status report is sent by a semi-persistent scheduling (SPS) uplink resource.

* * * * *